US007886110B2

(12) United States Patent
Matthews

(10) Patent No.: US 7,886,110 B2
(45) Date of Patent: Feb. 8, 2011

(54) DYNAMICALLY ADJUSTING CACHE POLICY BASED ON DEVICE LOAD IN A MASS STORAGE SYSTEM

(75) Inventor: Jeanna N. Matthews, Massena, NY (US)

(73) Assignee: Intel Corporation, Santa Clara, CA (US)

( * ) Notice: Subject to any disclaimer, the term of this patent is extended or adjusted under 35 U.S.C. 154(b) by 496 days.

(21) Appl. No.: 11/965,652

(22) Filed: Dec. 27, 2007

(65) Prior Publication Data

US 2009/0172249 A1 Jul. 2, 2009

(51) Int. Cl.
*G06F 12/00* (2006.01)
(52) U.S. Cl. ...................................... 711/113; 711/118
(58) Field of Classification Search ....................... None
See application file for complete search history.

(56) References Cited

U.S. PATENT DOCUMENTS

| 2004/0133707 | A1* | 7/2004 | Yoshiya et al. ................. 710/6 |
| 2005/0108473 | A1* | 5/2005 | Le Moal et al. ............. 711/113 |
| 2005/0193168 | A1* | 9/2005 | Eguchi et al. ............... 711/114 |
| 2009/0070527 | A1* | 3/2009 | Tetrick ....................... 711/113 |

* cited by examiner

*Primary Examiner*—Than Nguyen
(74) *Attorney, Agent, or Firm*—John F. Travis

(57) ABSTRACT

A dynamic cache policy manager for a mass memory may be used to decide whether a data request is to be routed to the cache or directly to the mass memory, based on estimated delays in processing the request. The choice may be based, at least partially, on the size of the respectively queues for the cache and mass memory. For write requests, the choice may be based on how many erase blocks are available in the cache.

21 Claims, 4 Drawing Sheets

DYNAMICALLY ADJUSTING CACHE POLICY BASED ON DEVICE LOAD IN A MASS STORAGE SYSTEM

BACKGROUND

Data transfers to/from a disk drive can be one of the biggest bottlenecks in a computer system. Caching of disk drive data can offer significantly improved performance, and may also reduce power consumption because the associated drive can be kept spun-down for longer periods of time. In a disk cache system, data can be written to either the cache or the disk drive or both. In a write-back cache, data written to the cache may be marked as 'dirty' (the data in cache has been updated but not the data on the disk drive), and then marked as 'clean' when the data is written to the disk drive. When data is dirty in the cache, it must be retrieved from the cache, but when the data is clean it can be retrieved from either the disk drive or the cache. Various storage systems have caching policies to determine whether to use the disk drive or the cache for any given request. One such policy is to always retrieve requested data from cache if the data is in the cache and is also marked as clean. Otherwise the data is retrieved from the disk drive. Even though a cache generally has much faster access times than the disk drive, in some instances the cache can become a bottleneck, and data reads from the cache can take longer than they would from the disk drive. This can happen if the queue of requests to the cache becomes large, while there are few or no requests to the disk drive itself. Further, some types of cache technology (e.g., NAND flash) periodically require time-consuming overhead operations such as reclaiming erase blocks, which causes further bottlenecks in retrieving data from the cache.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
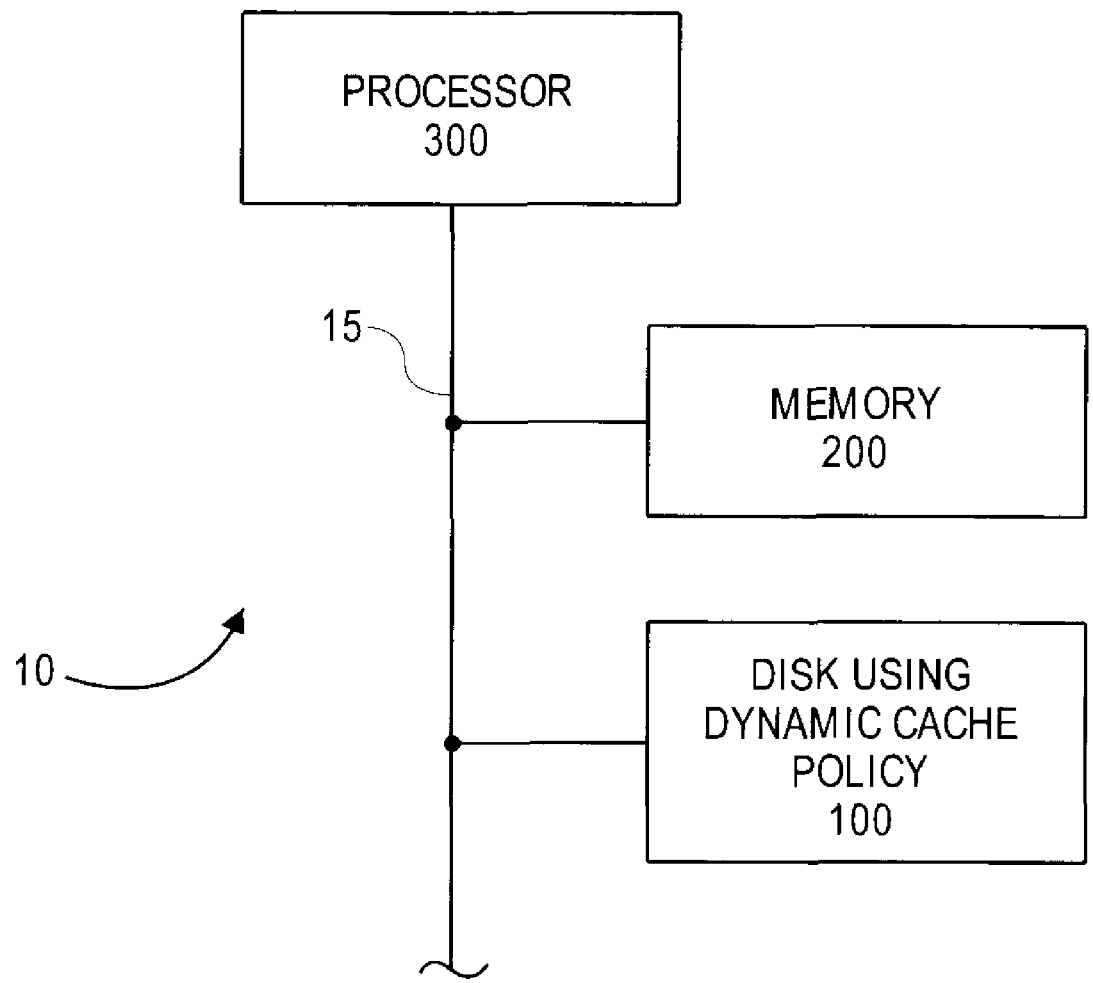
FIG. 1 shows a computer system, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

In various embodiments, a dynamic caching policy is used to determine whether to send data requests directly to a disk drive, or to the disk drive's associated cache, based at least in part on estimated delays in processing the request. The estimated delays may be based on the relative sizes of the request queues to the cache and the disk drive, and/or on the number of available erase blocks in the cache. A policy may use either or both of these criteria.

FIG. 1 shows a computer system, according to an embodiment of the invention. In system 10, a processor 300 may be coupled to, and operate with, a memory 200 and a disk drive 100 over one or more buses 15 and/or any intervening interface logic. The disk drive 100 may include a disk controller, and at least one cache. The cache may be considered part of the controller, part of the disk drive, and/or externally coupled to both. The logic and/or code to implement the cache policy may be part of the controller, part of the instructions implemented in the processor, externally coupled to the controller, or distributed in any manner among those areas.

Figure 2:
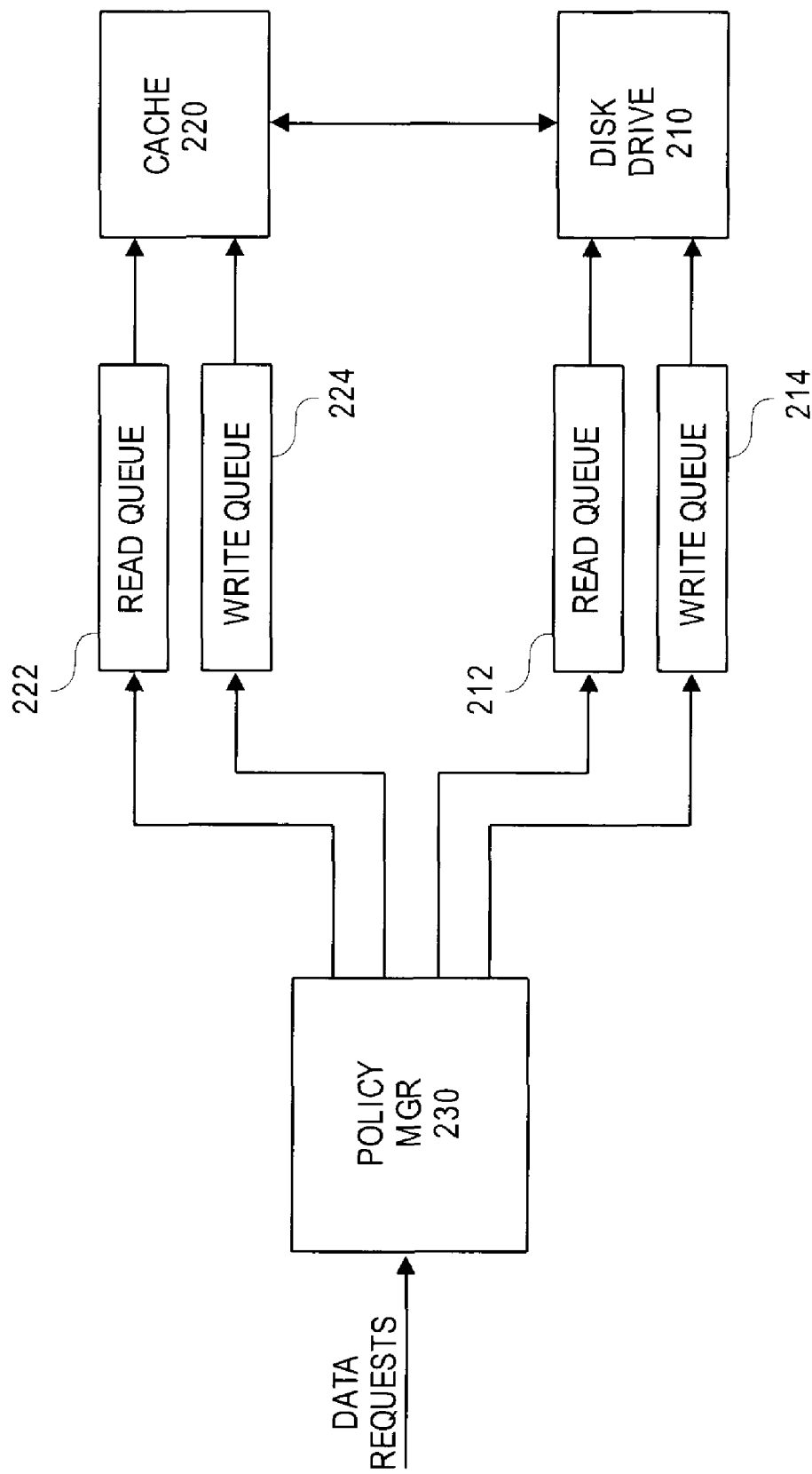
FIG. 2 shows a disk drive system, according to an embodiment of the invention.

FIG. 2 shows a disk drive system, according to an embodiment of the invention. Although a disk drive was originally named because it contained one or more rotating platters (e.g., rotating platters with magnetic media or optical media), the term has more recently been expanded to include so-called solid state disks (such as but not limited to flash memory, ferromagnetic memory, polymer memory, etc), which are simply solid state non-volatile mass storage devices that perform the same storage functions traditionally performed by rotating memory devices. The term 'disk drive', as used here, is defined to cover any mass storage device that can be used in the same applications currently served by rotating-media mass storage devices.

In the illustrated example of FIG. 2, disk drive 210 may be coupled to a cache memory 220. Cache 220 may be used to temporarily store data to be written to, and/or read from, the disk drive 210. In some embodiments, cache 220 may contain a memory that has faster read/write access times than a disk drive (e.g., NAND flash memory).

Data requests may be processed by a policy manager 230, which may be implemented by any combination of logic and/or instruction-based processing. The output of the policy manager may be to direct each data request to the cache 220 or to the disk drive 210. The associated data may then flow to/from the indicated cache or disk drive. As is known with cache technology, the cache and the disk drive may contain the same functional data, but sometimes may contain different versions of that same data. For example, with a write request, a given block of data may be immediately updated in the cache, but updating that same data in the disk drive may be delayed until a more convenient time. Such discrepancies between the cached data and the disk drive data may be marked as 'dirty' in the cache, so that a subsequent request for that data will be aware of the discrepancy and retrieve the updated data rather than the stale data. When the data on the disk drive is also updated, the corresponding data in the cache may be marked as 'clean', indicating that both the cache and the disk drive have the correct current data. Data in the cache may also be marked as 'invalid' to indicate that the system no longer considers the data to be in cache, but the data has not yet been physically erased from that area.

A write request may write data either directly to the disk drive, or to the cache (with the disk drive being updated from cache at a later time). If an older copy of the data being written is already present in the cache, writing the new data to the disk requires updating the copy in the cache or marking the older copy in the cache as invalid. If the cache does not contain an older copy of the data being written, then the data may be sent to either the cache or the disk. With a read request, assuming that the data is in the cache, and that the cached data and the associated data on the disk drive are both current, a request to read that data can obtain correct data from either the cache or the disk drive. However, the time required to actually process a read or write request for each of these choices may vary, depending on various factors. In the interest of efficiency and high throughput, it may be desirable to direct the request to the area that can complete the request most quickly. Although the cache may use a technology with an inherently faster access time, other factors may make it possible to read or write the data more quickly to the disk drive. One such factor is the comparative sizes of the request queues for the cache and the disk drive. (A large queue implies that the request will take a relatively long time before it can be processed.) Similarly, the number of erase blocks available in the cache may affect whether a write request can be processed efficiently. (A small number of available erase blocks implies that the existing data in the cache may have to be rearranged to free up more erase blocks, before the write request can be processed.) One purpose of the cache policy manager 230 is to determine which area (cache or disk drive) is likely to provide faster completion of the request, and then direct the request to that area.

In the illustrated embodiment, the cache 220 has a read queue 222 to handle read requests, and a write queue 224 to handle write requests. Similarly, the disk drive 210 has a read queue 212 and a write queue 214. These queues permit multiple requests to be buffered and processed in the order received, if the requests are received faster than they can be processed by the respective cache or disk drive. The embodiment shown has separate queues for read and write requests, but other embodiments may put both read and write requests into a single queue for that device.

The format of a request in a queue may take various forms. For example, in some embodiments a request may include the following information: 1) type of request, such as read, write, or erase (which can be considered a form of write), 2) starting address for the data, and 3) the amount of data. Other embodiments may place more, less, or different information in the queue. In some embodiments the actual data to be transferred may also be placed into the queue, although that process would be considered to be too inefficient for many applications. If the actual data is not placed in the queue, then the queue may contain a pointer to a separate buffer containing the data to be written or into which the data read should be placed.

The queues may be implemented in any feasible location, such as but not limited to: 1) in the cache or disk drive devices, 2) in the disk controller, 3) in the processor's memory, 4) etc. Regardless of the method of implementation, the 'size of the queue' that is considered in these embodiments of the invention may be measured in various ways, such as but not limited to: 1) the number of requests in the queue, 2) the amount of data to be transferred as a result of the requests in the queue, 3) the amount of time to actually read or write the data when processing the requests in the queue, 4) etc.

Figure 3:
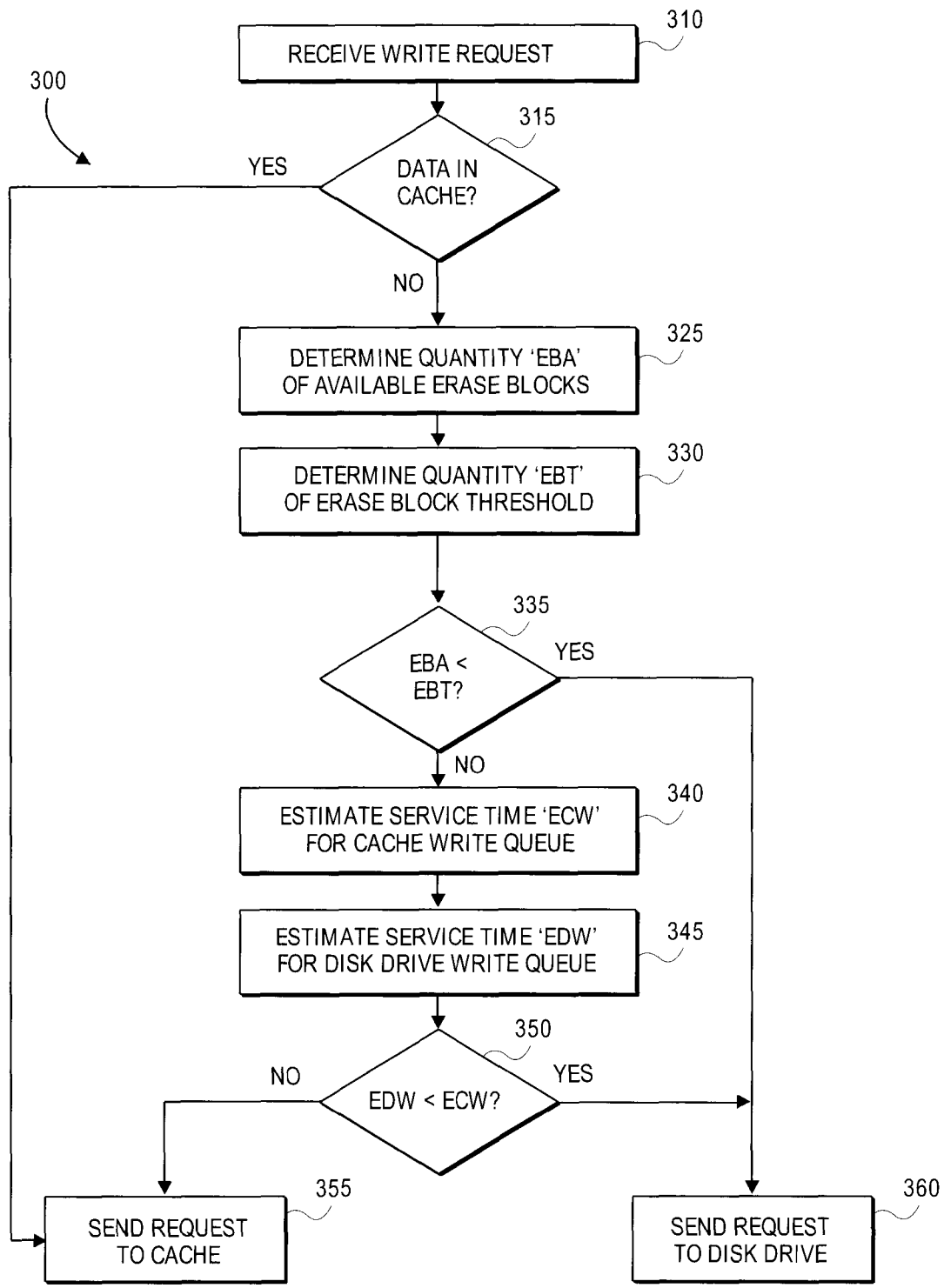
FIG. 3 shows a flow diagram of a method of dynamically adjusting cache policy for a write request, according to an embodiment of the invention.

FIG. 3 shows a flow diagram of a method of dynamically adjusting cache policy for a write request, according to an embodiment of the invention. In flow diagram 300, at 310 a write request is received by the policy manager. If an older version of this data is already in the cache (as determined at 315), then the new data may be sent to the cache at 355, replacing the older data there.

Otherwise, to determine where to write the data (i.e., write to cache or write to disk drive), at 325 the policy manager may determine the quantity of erase blocks available in the cache (indicated as the quantity 'EBA'). The value of EBA may be obtained by the policy manager in any feasible manner. In some embodiments, this value may be read from the disk controller. 'Erase blocks' may be defined as the number of blocks that have been erased and are available for receiving new write data. The concept of erase blocks may apply to any type of storage technology in which new data can only be written to an area that has been previously erased, and erasing is done in blocks rather than to single storage locations. Since modifying data that is currently in the cache may sometimes be done only by writing the new data to a new erase block, the number of available erase blocks may be an indication of whether the write operation is likely to be completed with that number of available erase blocks.

If EBA drops too low, an erase block reclaim operation may have to be performed, in which new erase blocks are created by consolidating the data from multiple blocks into a smaller number of blocks, and erasing the blocks that no longer have useful data in them. This is a potentially very time-consuming operation, and can delay the write operation if it has be done first.

At 330 a quantity known as the erase block threshold ('EBT') may be obtained. EBT is an indication of how many erase blocks should be available so that an erase block reclaim operation won't need to be performed before completing the write operation. Since reclaiming erase blocks is such a time-consuming operation, the value of EBT may be large enough to accommodate multiple such write operations. In some embodiments, the value of EBT is predetermined and remains fixed. In other embodiments, the value of EBT may be changed from time to time based on various criteria that are not defined here. At 335 EBA may be compared with EBT. If EBA is less than EBT, indicating that new erase blocks should be created, the data may be written at 360 to the disk drive rather than the cache. This may avoid further reducing the value of EBA before a reclaim operation can be performed.

If EBA is not less than EBT, as determined at 335, then writing the data to cache may be considered further by comparing how long it will probably take to be processed through the two different queues. At 340, an estimate 'ECW' is made of the time for the write request to work its way through the request queue for the cache. At 345, an estimate 'EDW' is made of the time for the write request to work its way through the request queue for the disk drive. In some embodiments these estimates may be based only on the requests already residing in the queue. In other embodiments, these estimates may also include the current request being considered. If the comparison of EDW with ECW at 350 indicates that it will take longer to go through the request queue for the disk drive, then the request may be routed to the queue for the cache at 355. If the comparison at 350 indicates that it will take longer to go through the request queue for the cache, the request may be routed to the queue for the disk drive at 360. If EDW=ECW, the policy manager may make either choice, depending on how it is programmed.

Although the forgoing description encompasses both a consideration of the number of available erase blocks and a comparison of the queue lengths, some embodiments may include only one of those two factors.

Figure 4:
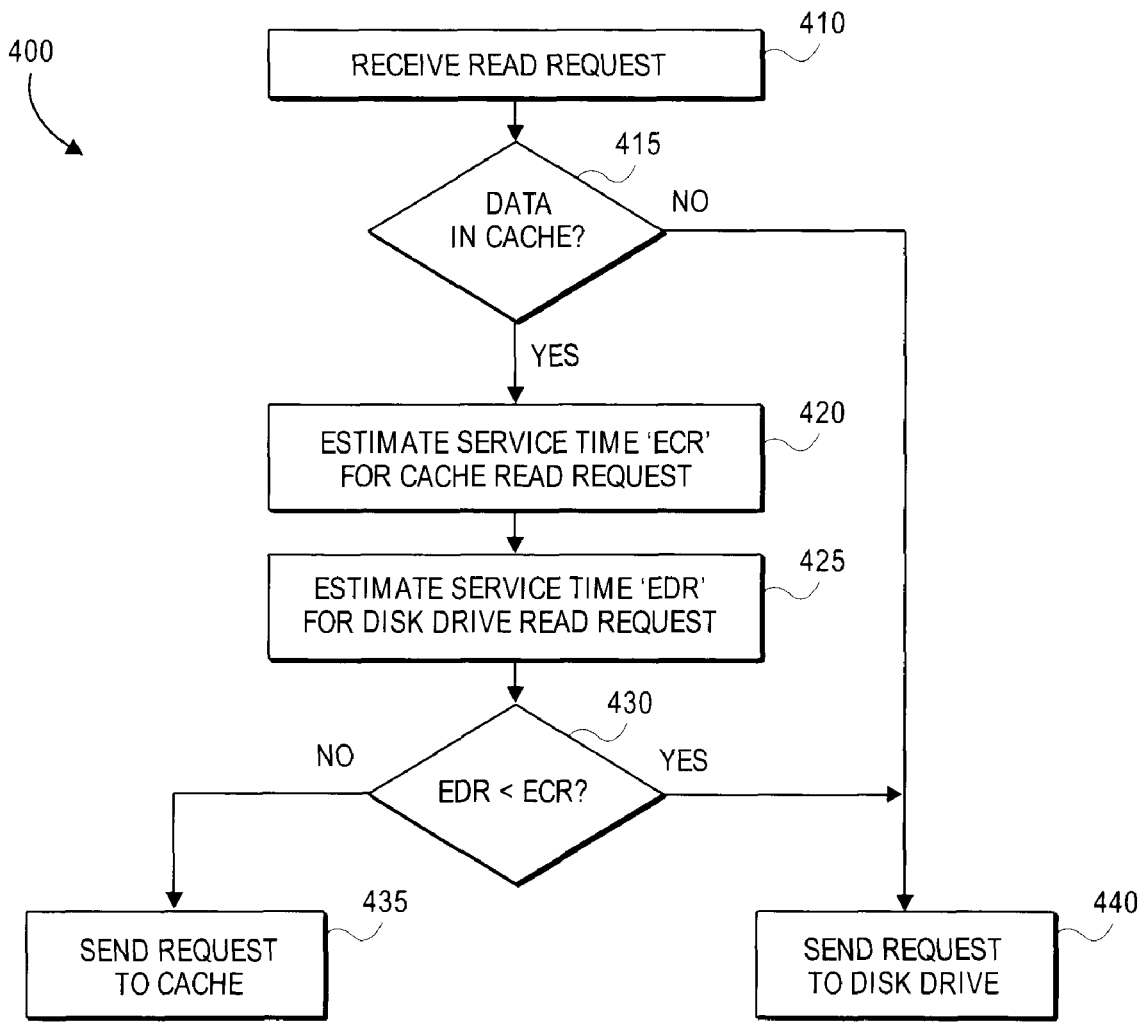
FIG. 4 shows a flow diagram of a method of dynamically adjusting cache policy for a read request, according to an embodiment of the invention.

FIG. 4 shows a flow diagram of a method of dynamically adjusting cache policy for a read request, according to an embodiment of the invention. In flow diagram 400, at 410 a read request is received by the policy manager. If this data is not in cache, as determined at 415, then the request must of course be routed to the read queue for the disk drive at 440, since that is the only place the data is available to be read. If the data is in cache, and the data is not marked as dirty, then an estimate may be made at 420 for the service time 'ECR', a measure of how long it will take for the request to be processed through the read queue for the cache. At 425 at estimate may be made for the service time 'EDR', a measure of how long it will take for the request to be processed through the read queue for the disk drive. As previously described for the write queues, these estimates may or may not include the time to also process the current request.

By comparing these two quantities at 430, it may be determined which queue will likely produce the faster processing time for the request. If EDR is less than ECR, the request may be placed in the read queue for the disk drive at 440. If EDR is greater than ECR, the request may be placed in the read queue for the cache at 435. If ECR and EDR are equal, the request may be sent to either queue, depending on how the policy manager is programmed.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
a mass storage system, comprising:
a mass storage device to store data;
a cache memory coupled to the mass storage device;
a cache policy manager coupled to the cache memory and to the mass storage device;
wherein the cache policy manager is to determine whether a data request is to be routed to the cache memory or to the mass storage device, based at least in part on an estimated delay in processing the data request;
wherein the estimated delay is based at least in part on a comparison between an estimated time in a first queue for the cache memory and an estimated time in a second queue for the mass storage device.

2. The apparatus of claim 1, wherein the estimated time in each queue is based at least in part on a number of requests in that queue.

3. The apparatus of claim 1, wherein the estimated time in each queue is based at least in part on an estimated time to complete the requests in that queue.

4. The apparatus of claim 1, wherein:
the data request can be either a read request or a write request, and
the first and second queues are each for handling both read requests and write requests.

5. The apparatus of claim 1 wherein:
the data request is a read request, and
the first and second queues are each for read requests but not write requests.

6. The apparatus of claim 1, wherein:
the data request is a write request; and
the first and second queues are each for write requests but not read requests.

7. The apparatus of claim 1, wherein the mass storage device comprises a disk drive containing a rotating platter.

8. The apparatus of claim 1, wherein the mass storage device comprises a solid state disk.

9. The apparatus of claim 1, further comprising a processor coupled to the mass storage system.

10. A method, comprising:
receiving a data request for a mass storage system;
determining an estimated delay in processing the request; and
routing the data request to either a mass storage device or to a cache memory for the mass storage device, based at least in part on the estimated delay;
wherein the cache memory comprises a non-volatile memory, and the estimated delay is based at least in part on how many erase blocks are available in the cache memory.

11. A method, comprising:
receiving a data request for a mass storage system;
determining an estimated delay in processing the request; and
routing the data request to either a mass storage device or to a cache memory for the mass storage device, based at least in part on the estimated delay;
wherein the estimated delay is based at least in part on a comparison between a size of a first request queue for the mass storage device and a size of a second request queue for the cache.

12. The method of claim 11, wherein the size of each of the first and second queues is based at least in part on how many requests are currently in the respective queue.

13. The method of claim 11, wherein the size of each of the first and second queues is based at least in part on an estimated time to process the requests currently in the respective queue.

14. The method of claim 11, wherein the request is a read request, and the estimated delay is based only on read requests in the respective queue.

15. The method of claim 11, wherein the request is a write request, and the estimated delay is based only on write requests in the respective queue.

16. An article comprising
a tangible machine-readable storage medium that contains instructions, which when executed by one or more processors result in performing operations comprising:
receiving a data request for a mass storage system;
determining an estimated delay in processing the request; and routing the data request to either a mass storage device or to a cache memory for the mass storage device, based at least in part on the estimated delay;

wherein the cache memory comprises a non-volatile memory, and the operation of determining the estimated delay is based at least in part on how many erase blocks are available in the cache memory.

17. An article comprising a tangible machine-readable storage medium that contains instructions, which when executed by one or more processors result in performing operations comprising:

receiving a data request for a mass storage system;

determining an estimated delay in processing the request; and routing the data request to either a mass storage device or to a cache memory for the mass storage device, based at least in part on the estimated delay;

wherein the operation of determining the estimated delay is based at least in part on a comparison between a size of a first request queue for the mass storage device and a size of a second request queue for the cache.

18. The article of claim 17, wherein the size of each of the first and second queues is based at least in part on how many requests are currently in the respective queue.

19. The article of claim 17, wherein the size of each of the first and second queues is based at least in part on an estimated time to process the requests currently in the respective queue.

20. The article of claim 17, wherein the request is a read request, and the operation of determining the estimated delay is based only on read requests in the respective queue.

21. The article of claim 17, wherein the request is a write request, and the operation of determining the estimated delay is based only on write requests in the respective queue.

* * * * *